E. W. McGLAULIN.

Button.

No. 9,751. Reissued June 14, 1881.

WITNESSES:

Wm. L. Coy.

Joseph A. Miller Jr.

INVENTOR:

Eben W. McGlaulin by Joseph A. Miller atty

N. PETERS, Photo-Lithographer, Washington, D. C.

UNITED STATES PATENT OFFICE.

EBEN W. McGLAULIN, OF PROVIDENCE, RHODE ISLAND.

BUTTON.

SPECIFICATION forming part of Reissued Letters Patent No. 9,751, dated June 14, 1881.

Original No. 200,554, dated February 19, 1878. Application for reissue filed September 25, 1880.

*To all whom it may concern:*

Be it known that I, EBEN W. McGLAULIN, of Providence, in the county of Providence and State of Rhode Island, have invented a new and valuable Improvement in Sleeve and Collar Buttons; and I do hereby declare that the following is a full, clear, and exact description of the same, reference being had to the accompanying drawings, forming part of this specification.

This invention has reference to an improvement in that class of sleeve-buttons, studs, and similar articles which are made in two parts connected together by means of spring-latches.

The invention consists in providing a tubular or hollow post with a contracted end, so as to form an interior projection, over which the spring-latches can pass to hold the button to the shoe without cutting into the material forming the post, and thereby weakening the same.

The invention further consists in providing the hollow post with a projection which will retain the shoe in the cuff or collar when the button is removed or before the button is inserted; and it further consists in the improved method for securing the spring actuating the latches, all of which will be more fully set forth hereinafter.

Figure 1:
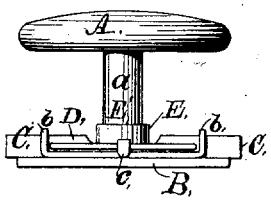
Figure 2:
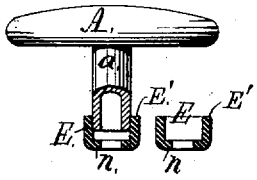
Figure 3:
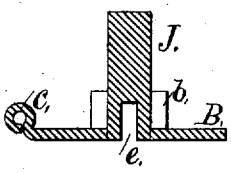
Figure 4:
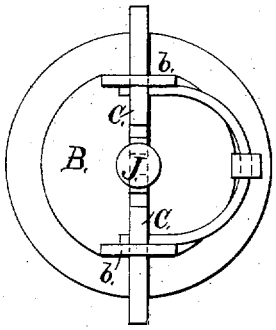
Figure 5:
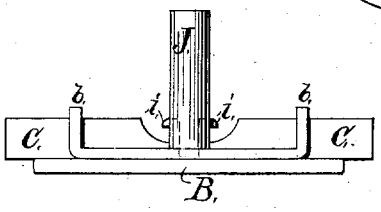

Figure 1 is a side view of a separable button constructed with my improvement. Fig. 2 is a view of the shoe and hollow post, showing the projection on the post and the contracted end, partly in section. Fig. 3 is a sectional view of the rear plate of the button, showing the solid post and the hooked end, in which the spring is secured. Fig. 4 is a plan view of the rear of the button. Fig. 5 is a view of the button, showing the push-bars and the latches, by means of which the hollow post and shoe are secured to the button.

In the drawings, A represents the shoe of my improved stud or button, having the central projecting tubular sleeve or post, *a*.

B indicates a metallic plate, of base metal, preferably, having two lugs, *b b*, at opposite edges, through which are cut slots for the reception of the catches C, and provided with an eye, *e*, in which is secured the spring D, by means of which the said catches are held to their engagement with the annular head E of post *a*.

Plate B is struck out by a die in blank form, after which the projections are turned up to form the lugs *b b* and eye *e*. A post, J, is soldered into the central aperture in plate B, and a slot is then cut across the plate and also the lugs and post, Fig. 3. The pushers C are narrow plates having hooked ends *i i*, and are arranged to slide in said groove.

When the two parts of the button are fitted together the post J enters the tubular post *a*, and the hooked ends *i* of said pushers then catch over the inner edge of the flange *n* and enter the grooves of head or cap E. Said cap is formed from a perforated disk by striking up the same in suitable dies. It is in the nature of a collar or short tube having on one end an inward-turned annular flange, *n*. The head is slipped over the lower end of post *a* and soldered thereto, as shown in Fig. 2, so that a space or annular groove is left between flange *n* and the circular end of the post.

The use of the cap E enables the post *a* to be made of less diameter than would be otherwise practicable, since it provides sufficient space for the operation of the pushers for causing them to engage with or disengage from the head E.

E′ is a shoulder, which, when the hollow post *a* is inserted into the button-holes, holds the shoe and prevents the post from withdrawing from the cuffs or collar-bands when the button is removed, or before the same is secured. It thus greatly facilitates the use of the detachable button.

I am aware that it is not new to make a button in two parts, one adapted to fit into the other, and held together by latches operated by double pushers, and I therefore make no claim to such, broadly.

Having thus described my invention, I claim as new and desire to secure by Letters Patent—

1. The combination, with the shoe, of a detachable button provided with a tubular post of the cap E, secured to the post so as to form a shoulder or enlargement near the end of the post, and an annular groove between the contracted opening and the post of larger diameter than the interior of the post, as described.

2. In a separable button or stud, the combination, with the shoe, of a tubular post provided with an enlarged portion near its end and an annular groove to receive the catches of greater diameter than the interior of the post both above and below the groove, the lower end of the post being contracted, as shown, leaving a uniform thickness of metal and a rounded end to the post, all as set forth.

3. The combination, with the shoe A, hollow post *a*, and button, of the plate B, provided with the eye *c*, to secure the spring D, and the lugs *b b*, made in one piece, as described.

4. The disk A, having the tubular stud *a* and flanged or head cap E *n*, the latter being struck up from a perforated disk and soldered to the stud *a*, so as to form the annular groove, as shown, in combination with the stud J and pushers C C, secured to the disk B, and having catches *i i*, all as and for the purposes specified.

EBEN W. McGLAULIN.

Witnesses:

JOSEPH A. MILLER,

JOSEPH A. MILLER, Jr.